US012598061B2

(12) United States Patent
Barnes et al.

(10) Patent No.: US 12,598,061 B2
(45) Date of Patent: Apr. 7, 2026

(54) HISTORY ACCESS FOR END-TO-END (E2E) SECURE CONTENT

(71) Applicant: Cisco Technology, Inc., San Jose, CA (US)

(72) Inventors: Richard Lee Barnes, Arlington, VA (US); Brian Christopher Powell, El Segundo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 144 days.

(21) Appl. No.: 18/418,900

(22) Filed: Jan. 22, 2024

(65) Prior Publication Data

US 2025/0202691 A1 Jun. 19, 2025

Related U.S. Application Data

(60) Provisional application No. 63/609,448, filed on Dec. 13, 2023.

(51) Int. Cl.
| | |
|---|---|
| *H04L 9/08* | (2006.01) |
| *H04L 9/40* | (2022.01) |
| *H04L 9/14* | (2006.01) |

(52) U.S. Cl.
CPC .......... *H04L 9/0836* (2013.01); *H04L 9/0822* (2013.01); *H04L 9/0833* (2013.01); *H04L 9/0861* (2013.01); *H04L 9/0891* (2013.01); *H04L 9/0894* (2013.01); *H04L 63/064* (2013.01); *H04L 9/088* (2013.01); *H04L 9/14* (2013.01); *H04L 63/068* (2013.01)

(58) Field of Classification Search
CPC ....... H04L 9/08; H04L 9/0833; H04L 9/0836; H04L 9/0891; H04L 9/088; H04L 9/0861; H04L 9/0822; H04L 9/0894; H04L 9/14; H04L 63/06; H04L 63/064; H04L 63/065; H04L 63/068
See application file for complete search history.

(56) References Cited

U.S. PATENT DOCUMENTS

| | | | |
|---|---|---|---|
| 8,700,899 B1 * | 4/2014 | Juels ................... | H04W 12/043 380/47 |
| 8,954,740 B1 | 2/2015 | Moscaritolo et al. | |
| 9,871,775 B2 | 1/2018 | Biggs et al. | |
| 10,412,063 B1 * | 9/2019 | Mandich ............... | H04L 9/0869 |
| 10,855,440 B1 | 12/2020 | Alwen et al. | |
| 10,992,455 B2 | 4/2021 | Walling et al. | |
| 2009/0245517 A1 | 10/2009 | Tinnakornsrisuphap et al. | |

(Continued)

OTHER PUBLICATIONS

Barnes R., et al., "RFC 9420 the Messaging Layer Security (MLS) Protocol," Internet Engineering Task Force (IETF), Standards Track, Jul. 2023, 132 pages.

(Continued)

*Primary Examiner* — Shaqueal D Wade-Wright

(74) *Attorney, Agent, or Firm* — Edell, Shapiro & Finnan, LLC

(57) ABSTRACT

An embodiment provides new joiners to a conversation with access to historical keys using an encrypted skip list that can be safely stored on untrusted servers. This list provides random access to conversation content with logarithmic complexity (queries and data size), and imposes small (log-scale) overhead on linear/full access to the conversation content.

20 Claims, 13 Drawing Sheets

(56) References Cited

U.S. PATENT DOCUMENTS

| | | | |
|---|---|---|---|
| 2010/0023762 A1 * | 1/2010 | Kailash | H04L 67/02 |
| | | | 713/168 |
| 2010/0296655 A1 * | 11/2010 | Solow | H04L 63/062 |
| | | | 380/279 |
| 2012/0243683 A1 | 9/2012 | Oba et al. | |
| 2014/0157382 A1 | 6/2014 | Ford | |
| 2022/0100883 A1 | 3/2022 | Leshinsky et al. | |
| 2022/0131838 A1 | 4/2022 | Mandich et al. | |
| 2022/0376909 A1 | 11/2022 | Vijayanarayanan | |
| 2023/0015693 A1 * | 1/2023 | Ansari | H04L 9/0894 |
| 2023/0102966 A1 | 3/2023 | Barnes | |
| 2023/0198749 A1 * | 6/2023 | Tolba | H04L 12/1818 |
| | | | 380/278 |
| 2024/0055125 A1 * | 2/2024 | Sinha | A61B 5/721 |

OTHER PUBLICATIONS

Curtmola R., et al., "Searchable Symmetric Encryption: Improved Definitions and Efficient Constructions," 13th ACM Conference on Computer and Communications Security (CCS '06), Oct. 30, 2006, pp. 1-33.
Perrin T., et al., "The Double Ratchet Algorithm," Revision 1, Nov. 20, 2016, pp. 1-35.
Virgil Security, "Group Encryption," retrieved from https://developer. virgilsecurity.com/docs/e3kit/end-to-end-encryption/group-chat/, Jan. 5, 2024, 5 pages.
Wikipedia, "Skip list," The Free Encyclopedia, https://en.wikipedia. org/wiki/Skip_list, last edited on Dec. 28, 2023, 6 pages.

\* cited by examiner

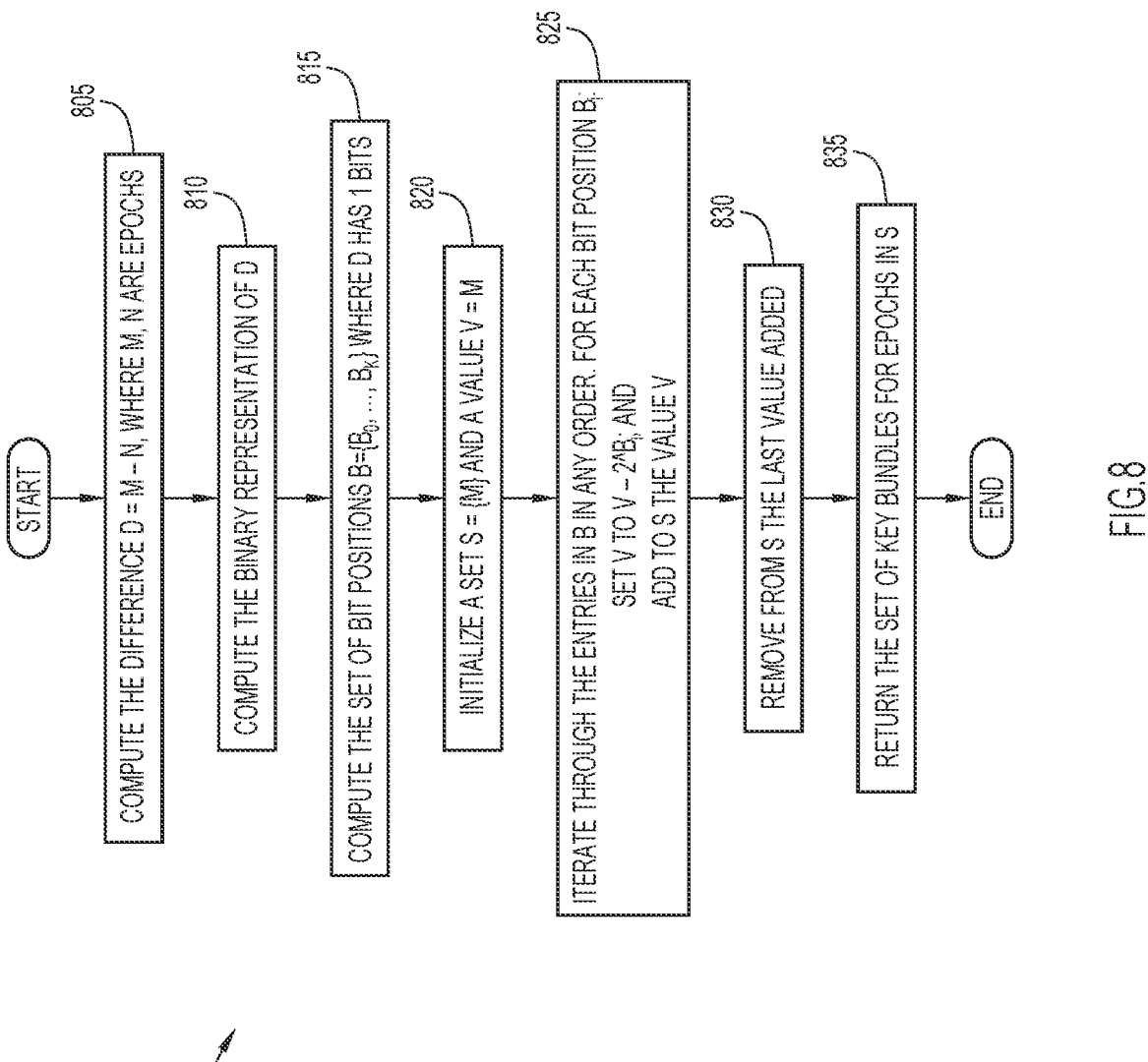

START

805 COMPUTE THE DIFFERENCE D = M – N, WHERE M, N ARE EPOCHS

810 COMPUTE THE BINARY REPRESENTATION OF D

815 COMPUTE THE SET OF BIT POSITIONS B={B₀,..., Bₖ} WHERE D HAS 1 BITS

820 INITIALIZE A SET S = {M} AND A VALUE V = M

825 ITERATE THROUGH THE ENTRIES IN B IN ANY ORDER. FOR EACH BIT POSITION Bᵢ SET V TO V – 2^Bᵢ; AND ADD TO S THE VALUE V

830 REMOVE FROM S THE LAST VALUE ADDED

835 RETURN THE SET OF KEY BUNDLES FOR EPOCHS IN S

END

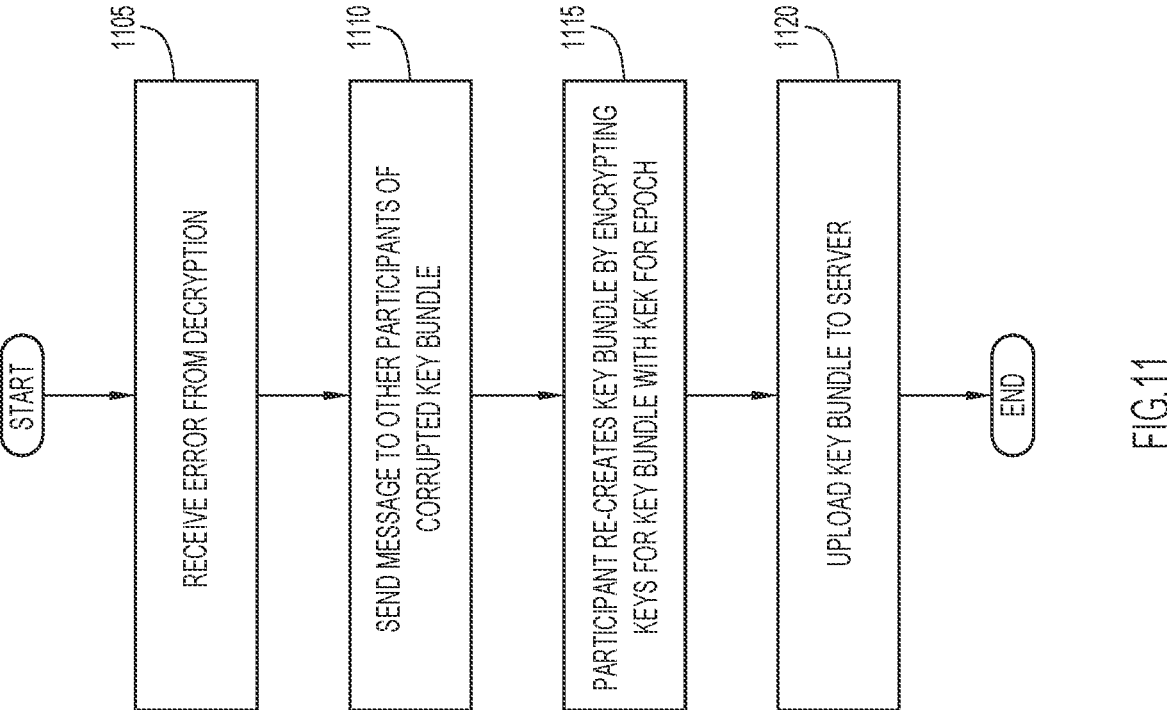
1105 — RECEIVE ERROR FROM DECRYPTION
1110 — SEND MESSAGE TO OTHER PARTICIPANTS OF CORRUPTED KEY BUNDLE
1115 — PARTICIPANT RE-CREATES KEY BUNDLE BY ENCRYPTING KEYS FOR KEY BUNDLE WITH KEK FOR EPOCH
1120 — UPLOAD KEY BUNDLE TO SERVER
START
END
1100
FIG.11

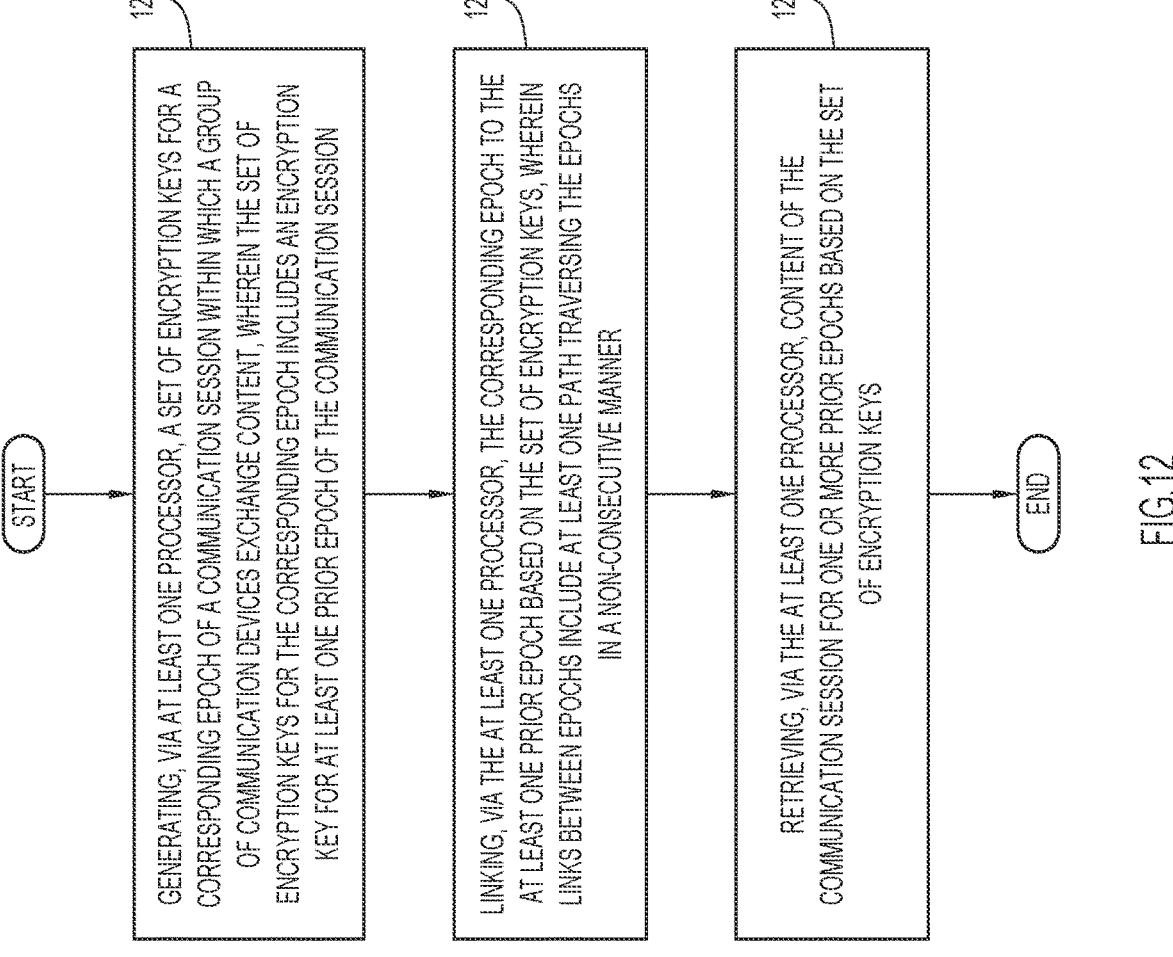

1205

GENERATING, VIA AT LEAST ONE PROCESSOR, A SET OF ENCRYPTION KEYS FOR A CORRESPONDING EPOCH OF A COMMUNICATION SESSION WITHIN WHICH A GROUP OF COMMUNICATION DEVICES EXCHANGE CONTENT, WHEREIN THE SET OF ENCRYPTION KEYS FOR THE CORRESPONDING EPOCH INCLUDES AN ENCRYPTION KEY FOR AT LEAST ONE PRIOR EPOCH OF THE COMMUNICATION SESSION

1210

LINKING, VIA THE AT LEAST ONE PROCESSOR, THE CORRESPONDING EPOCH TO THE AT LEAST ONE PRIOR EPOCH BASED ON THE SET OF ENCRYPTION KEYS, WHEREIN LINKS BETWEEN EPOCHS INCLUDE AT LEAST ONE PATH TRAVERSING THE EPOCHS IN A NON-CONSECUTIVE MANNER

1215

RETRIEVING, VIA THE AT LEAST ONE PROCESSOR, CONTENT OF THE COMMUNICATION SESSION FOR ONE OR MORE PRIOR EPOCHS BASED ON THE SET OF ENCRYPTION KEYS

START

END

HISTORY ACCESS FOR END-TO-END (E2E) SECURE CONTENT

CROSS-REFERENCE TO RELATED APPLICATION

This application claims priority to U.S. Provisional Patent Application No. 63/609,448, entitled "Efficient History Access for End-to-End (E2E)-Secure Persistent Content" and filed on Dec. 13, 2023, the entirety of which is incorporated herein by reference.

TECHNICAL FIELD

The present disclosure relates to communication systems.

BACKGROUND

End-to-end (E2E) encryption refers to mechanisms that allow devices to communicate via a cloud service without that cloud service being able to read or tamper with the communications. Modern end-to-end encryption (E2EE) protocols provide two types of confidentiality guarantees, namely forward secrecy (FS) and post-compromise security (PCS). Forward secrecy (FS) prevents participants in a conversation from decrypting content from before they joined, while post-compromise security (PCS) prevents participants in a conversation from decrypting content after they leave.

Some applications want to remove forward secrecy (FS) while keeping post-compromise security (PCS). For example, a messaging application may want to allow a new joiner to see messages that were sent before they joined, or a whiteboarding application may want to allow a new joiner to see strokes that were already written to the whiteboard, while still ensuring that a user removed from a conversation can no longer decrypt messages after they are removed. However, a given application follows one of a few patterns, all of which have disadvantages. For instance, a pattern may not enable new joiners to get historical content. This pattern is not viewed as an acceptable user experience by many applications. In a further pattern, a conversation may use a constant key, so once a new joiner has the current key, they can decrypt old content, but also content sent after they leave the conversation. Because of the security shortcomings, this pattern is mainly used in example applications. In another pattern, when a new device joins a conversation, it forms a secure channel with a device already in the conversation, and the old device provides the historical content or keys to the new device. This pattern makes the process of adding a device very onerous. In addition, a pattern may use a key server trusted by the devices in a conversation that stores historical keys and provides access to authorized devices. This pattern requires a trusted party to operate the key server (e.g., the organization to which the users in a conversation belong).

BRIEF DESCRIPTION OF THE DRAWINGS

FIG. 8 illustrates a flowchart of a method for building a path between epochs, according to an example embodiment.

FIG. 11 illustrates a flowchart of a method for repairing a corrupt key bundle, according to an example embodiment FIG. 12 illustrates a flowchart of a generalized method for history access, according to an example embodiment.

DESCRIPTION OF EXAMPLE EMBODIMENTS

Overview

Figure 1:
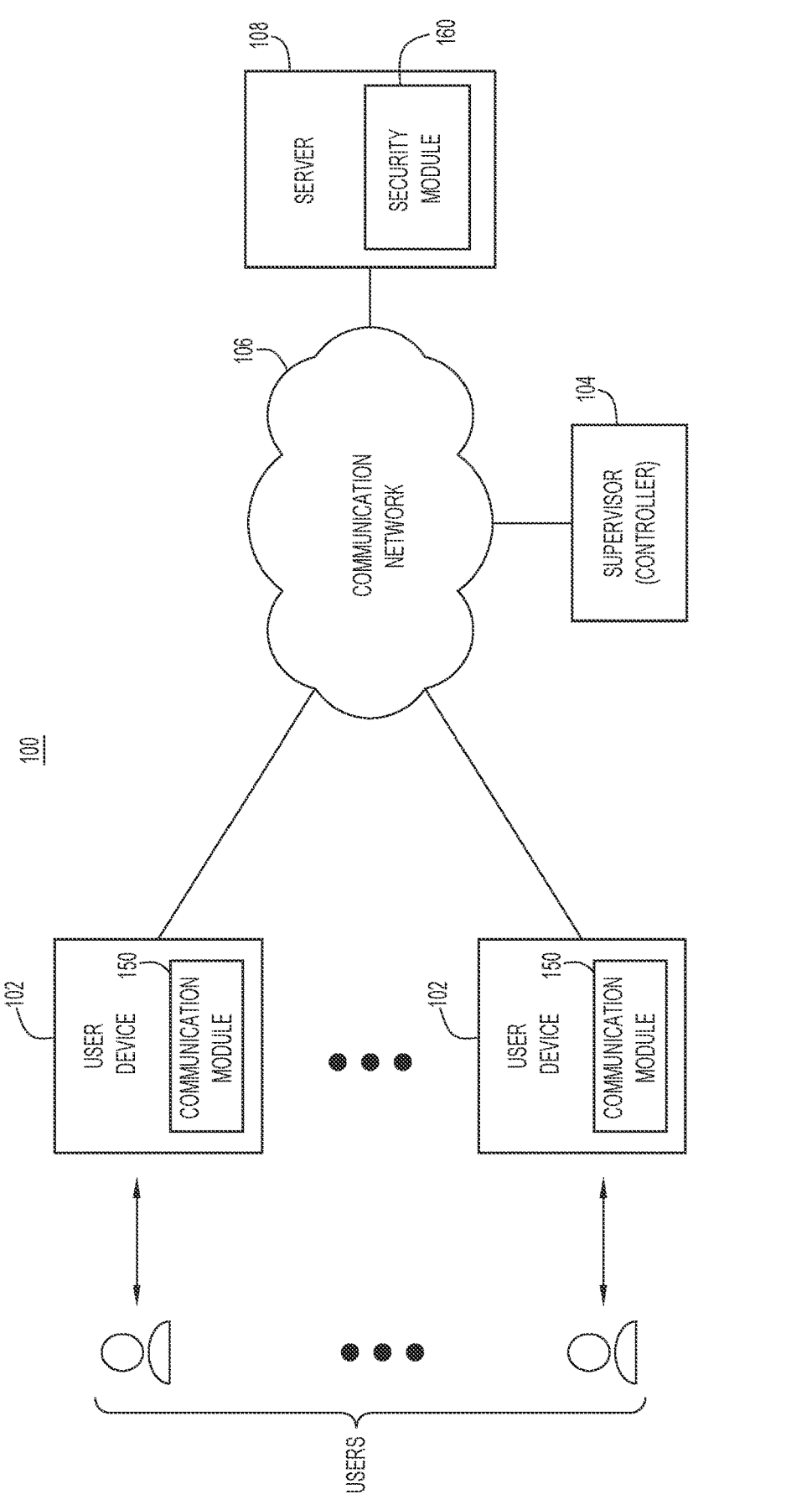
FIG. 1 is a block diagram of an example communication environment in which history access of a communication session may be implemented, according to an example embodiment.

An embodiment provides new joiners to a conversation with access to historical keys using an encrypted skip list that can be safely stored on untrusted servers. This list provides random access to conversation content with logarithmic complexity (queries and data size), and imposes small (log-scale) overhead on linear/full access to the conversation content.

Example Embodiments

End-to-end (E2E) encryption is valuable, but has historically struggled to efficiently and securely provide access to historical content. An embodiment provides new joiners to a conversation with access to historical keys using an encrypted skip list that can be safely stored on untrusted servers. This list provides random access to conversation content with logarithmic complexity (queries and data size), and imposes small (log-scale) overhead on linear/full access to the conversation content.

A present embodiment entails a mechanism to provide historical keys to new joiners of a conversation. This mechanism is efficient for various cases, including random access (e.g., referencing a specific old message, etc.), sequential access (e.g., scrolling back through a message list, etc.), and full access (e.g., downloading all prior whiteboard strokes, etc.). In addition, all of the data used for this synchronization may be stored on untrusted servers.

An embodiment provides access to historical keys, while also providing post-compromise security (PCS), without onerous requirements on devices, and without a need for trusted infrastructure. The embodiment draws on skip lists, which is a data structure that effectively enriches a linked list with additional links that facilitate random access. This data structure is specialized to the append-only case that end-to-end (E2E) encryption involves, and replaces its generic links with encrypted links which reference the location of the referenced data (by epoch) and the key with which to decrypt the referenced data. These links are similar to the encrypted linked lists used in Structured Symmetric Encryption (SSE). SSE relies on encrypting links to obscure both the data location and the key from the server. The embodiment only relies on the latter property, thereby effectively using encrypted links to selectively decrypt specific portions of an overall encrypted data structure.

An embodiment stores historical keys in an encrypted skip list in which each entry contains encrypted pointers reaching increasingly further back in history. Because it is encrypted, this skip list is safe to store on an untrusted server. Clients in a conversation add to the skip list, and make random-access queries with logarithmic complexity. Clients query the skip list to retrieve the keys they use to decrypt content.

A client generally represents hardware and/or software that a user uses to engage in end-to-end (E2E) secure communications. A client participates in one or more end-to-end secure conversations or other communication sessions. The clients in a conversation use an end-to-end encryption (E2EE) protocol, such as messaging layer security (MLS) or Double Ratchet to establish keys for E2E encryption. Each conversation has a separate E2EE protocol state. Clients may be added or removed from a conversation over time. The E2EE protocol provides a sequence of keys over time, which are used to encrypt content. Each period of time with a stable set of keys is referred to as an epoch. The epoch keys are known only to the members of the conversation in the epoch. When a client is added to or removed from the conversation, a new epoch is triggered with new keys known only to the updated membership.

In each epoch, the client derives from the epoch keys one or more content encryption keys (CEKs) which are used to encrypt conversation content sent during the epoch, and a key encryption key (KEK) which is used to encrypt a key bundle for the epoch (e.g., Authenticated Encryption with Additional Data (AEAD), etc.). This enables the group members to verify that the content of an encrypted object has not been altered while it was stored on an untrusted server or transmitted over an untrusted channel. Content encrypted with a CEK has been encrypted either directly with that CEK or with a key derived from that CEK (e.g., using the MLS Secret Tree).

While the present embodiments are described with respect to controlling access to content for conversations, it will be appreciated that access may be controlled for any content (e.g., audio, video, text, images, streaming data, etc.) of any communication sessions (e.g., teleconferencing or videoconferencing, text or chat sessions, collaboration sessions, voice communication, messaging sessions (e.g., SMS, etc.), spaces, whiteboarding, etc.).

FIG. 1 illustrates a block diagram of an example communication environment or system 100 in which an embodiment presented herein may be implemented. Environment 100 includes multiple computer devices 102 (collectively referred to as computer devices, participant devices, communication devices, or platforms) operated by local users/participants, a supervisor or server (also referred to as a "controller") 104 configured to support communication sessions (e.g., teleconferencing, video-conferencing, chat sessions, messaging sessions (e.g., SMS, etc.), spaces, whiteboarding, etc.) between the computer devices, a server 108, and a communication network 106 communicatively coupled to the computer devices, the supervisor, and the server. Computer devices 102 can take on a variety of forms, including a smartphone, tablet, laptop computer, desktop computer, video-conference endpoint, and the like.

Communication network 106 may include one or more wide area networks (WANs), such as the Internet, and one or more local area networks (LANs). Computer devices 102 may communicate with each other, with supervisor 104, and with server 108, over communication network 106 using a variety of known or hereafter developed communication protocols. For example, the computer devices 102 and supervisor 104 may exchange Internet Protocol (IP) data packets, Realtime Transport Protocol (RTP) media packets (e.g., audio and video packets), and so on.

Computer devices 102 may each host a communication module 150. According to embodiments presented herein, when a computer device 102 joins a communication session under control of communication application or module 150, security module 160 of server 108 stores and manages keys for computer devices 102 for the communication session. The keys are used to control access (or decryption) by participants for content of prior epochs. An epoch generally refers to a portion of a communication session with a same group of participants. When the group changes (e.g., a participant is added or removed), a new epoch is initiated for the communication session. Accordingly, an embodiment removes forward secrecy (FS) while maintaining post-compromise security (PCS).

Figure 2:
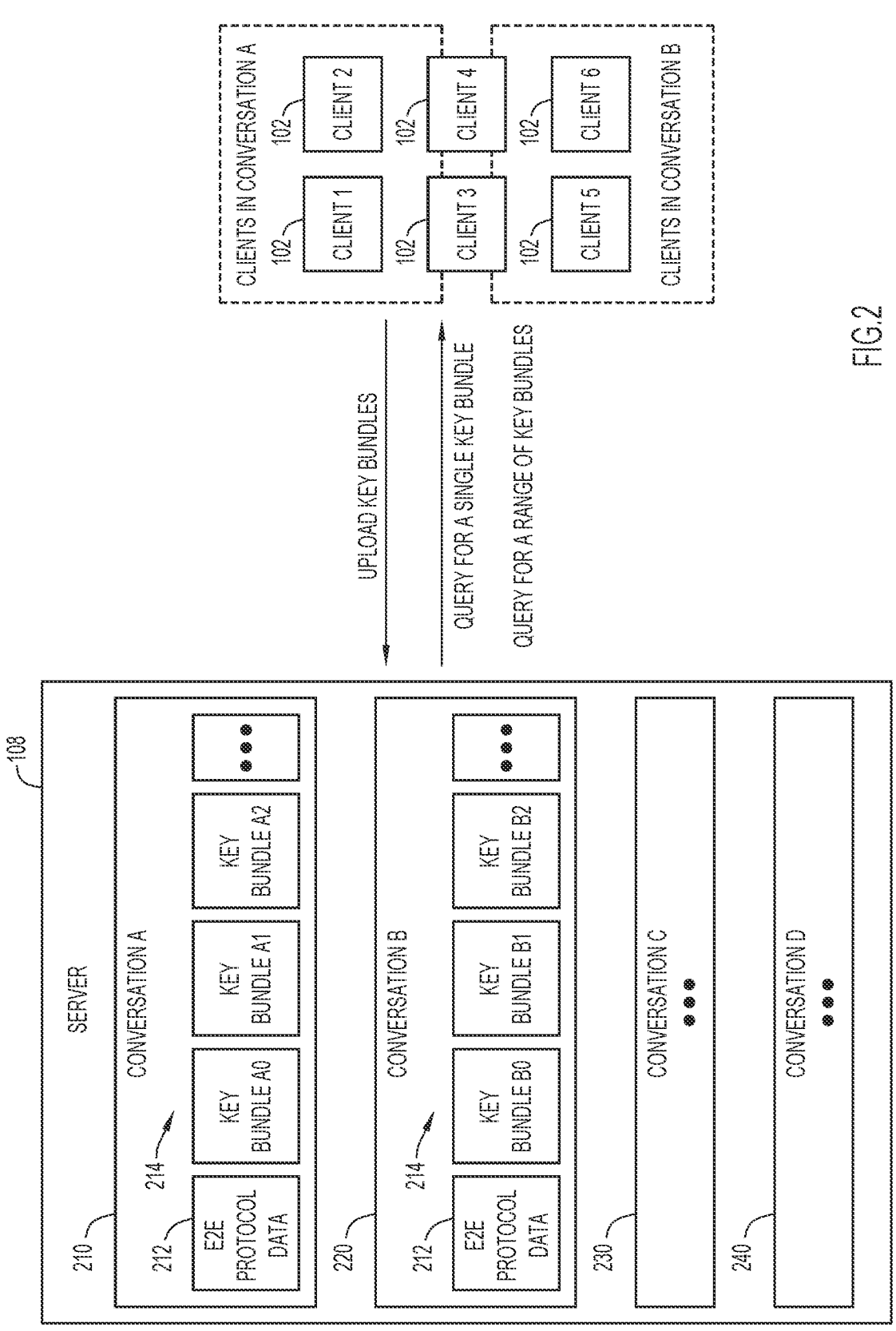
FIG. 2 illustrates conversations maintained on a server for various client devices, according to an example embodiment.

With continued reference to FIG. 1, FIG. 2 illustrates conversations maintained on server 108 for various client devices, according to an example embodiment. Initially, computer devices 102 (via communication module 150) enable users to join and leave a communication session. The communication session is managed by supervisor 104. For example, client devices 102 may participate in conversations. The client devices use the end-to-end encryption (E2EE) protocol to obtain keys for epochs where they are members of the group for the conversation. The client devices use present embodiments to obtain keys for epochs before they were added to the group. An epoch generally refers to a portion of a communication session with a same group of participants. When the group changes (e.g., a participant is added or removed), a new epoch is initiated for the communication session.

Each client device 102 holds the keys for a current epoch. The client device may also have a cache of older keys which it can use to optimize look-ups for specific keys. Server 108 stores data that client devices use to compute older keys. For example, server 108 may store data for conversations 210 (e.g., Conversation A), 220 (Conversation B), 230 (Conversation C), and 240 (Conversation D). Conversation A may include clients 1-4, while conversation B may include clients 3-6 (as shown in FIG. 2). In this case, clients 3 and 4 are members of conversations A and B. For each conversation 210-240, server 108 stores end-to-end (E2E) protocol data 212 and a skip list 214 comprising a sequence of key bundles, each for a corresponding epoch. By way of example, data for conversation 210 includes end-to-end (E2E) protocol data 212 and skip list 214 comprising key bundles A0, A1, A2, etc. (e.g., for epochs 0, 1, 2, etc.). Data for conversation 220 includes end-to-end (E2E) protocol data 212 and skip list 214 comprising key bundles B0, B1, B2, etc. (e.g., for epochs 0, 1, 2, etc.).

The key bundle (or set of encryption keys) for an epoch N is an encrypted object that may have the following structure. The content of a key bundle is a set of tuples (M, key_encryption_key_M) each providing the key encryption key for a prior epoch M, where the set of epochs to be stored is described below. The key bundle is encrypted using a key encryption key (KEK) for epoch N. Because the KEK for epoch N is unknown to server 108, this bundle can be safely stored on the server without giving the server access to its contents. The server also stores one or more content encryption keys (CEKs) for each epoch that are encrypted under the KEK for the epoch. The CEKs encrypt content for a corresponding epoch. Server 108 provides interfaces for client devices 102 to upload and download key bundles (via security module 160). The client devices may query for a single key bundle or a range of key bundles in order to access content for corresponding epochs.

If the communication session uses servers to facilitate the end-to-end encryption (E2EE) protocol, those functions may be combined with the functions described here. For example, a query to the server carrying an E2EE protocol message that initiates a new epoch may also upload the key bundle and encrypted CEK for the new epoch.

Figure 3:
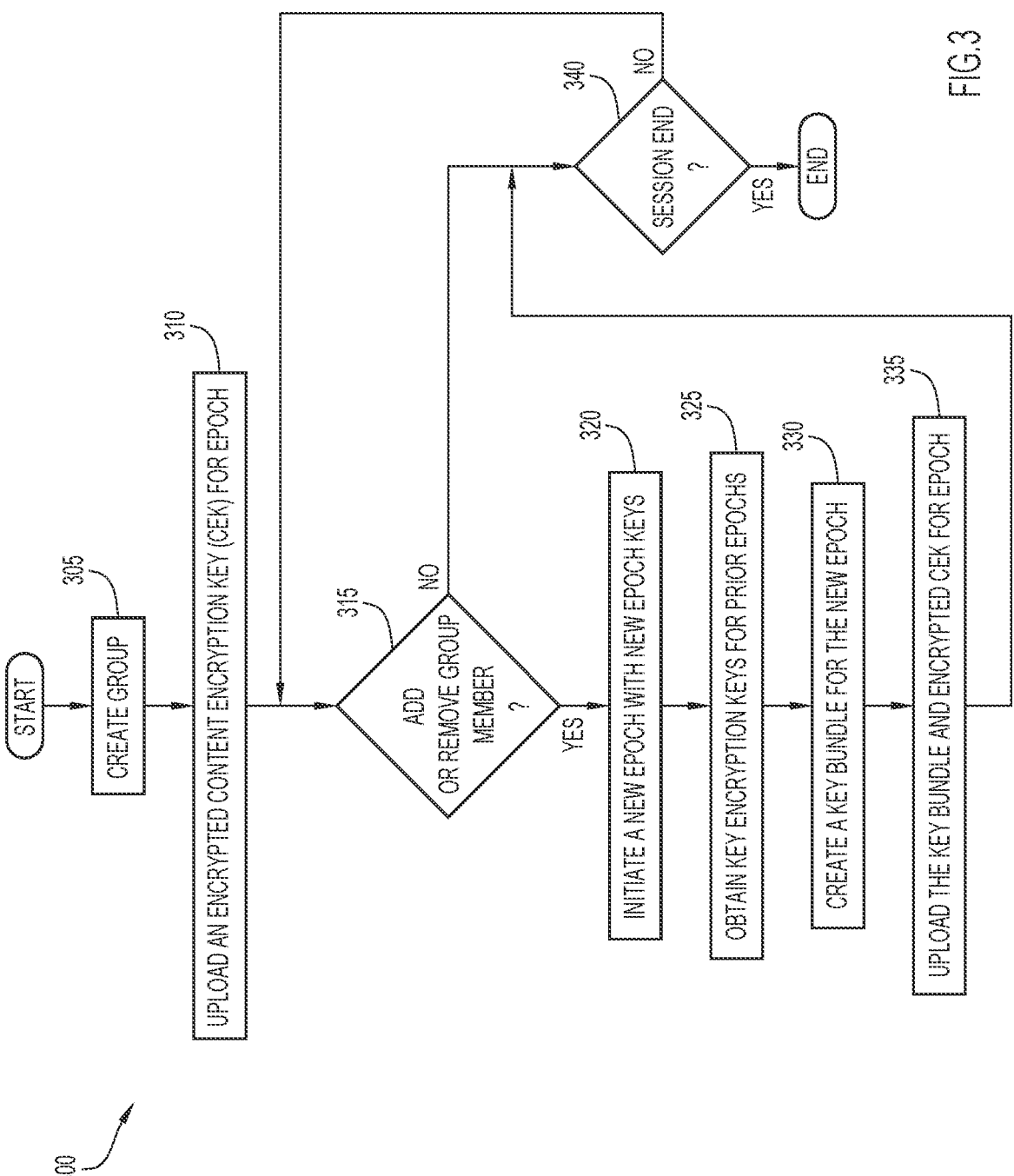
FIG. 3 illustrates a flowchart of a method for generating and storing key bundles, according to an example embodiment.
Figure 4:
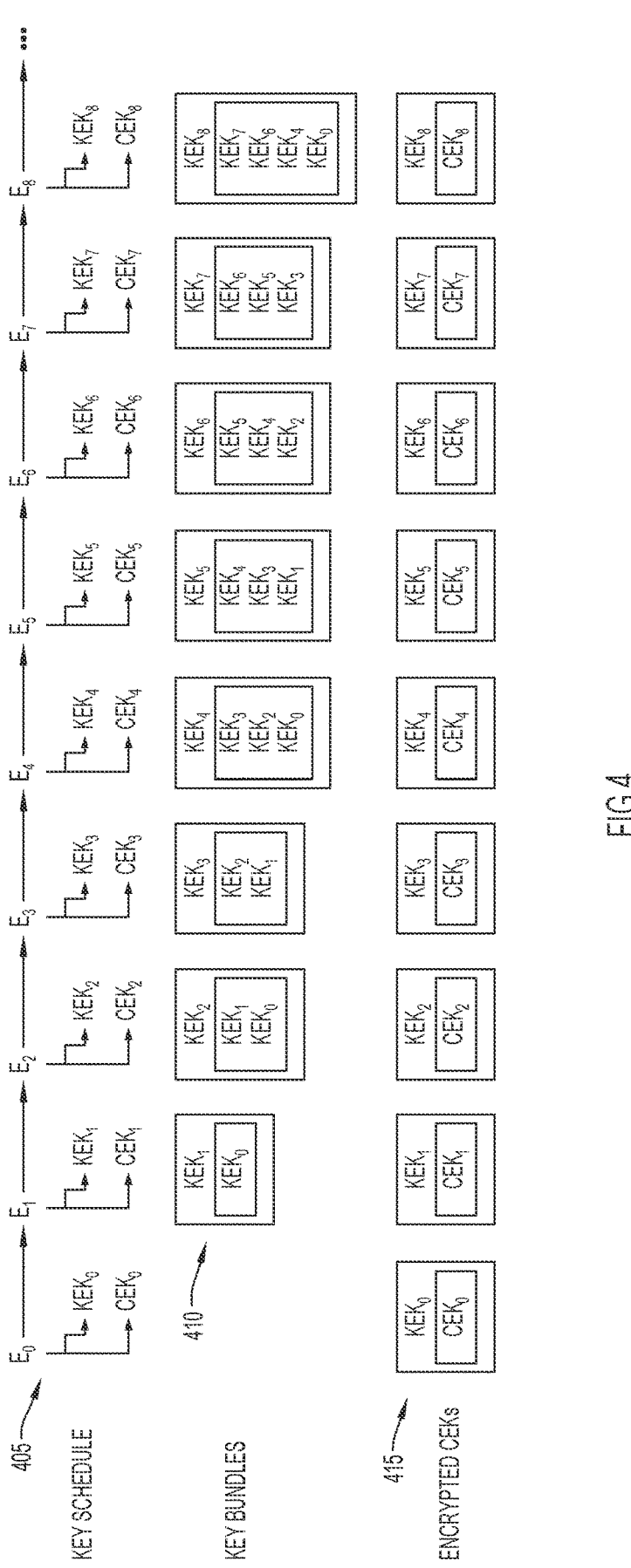
FIG. 4 illustrates a diagram of an arrangement of key bundles for epochs of a communication session, according to an example embodiment.
Figure 5:
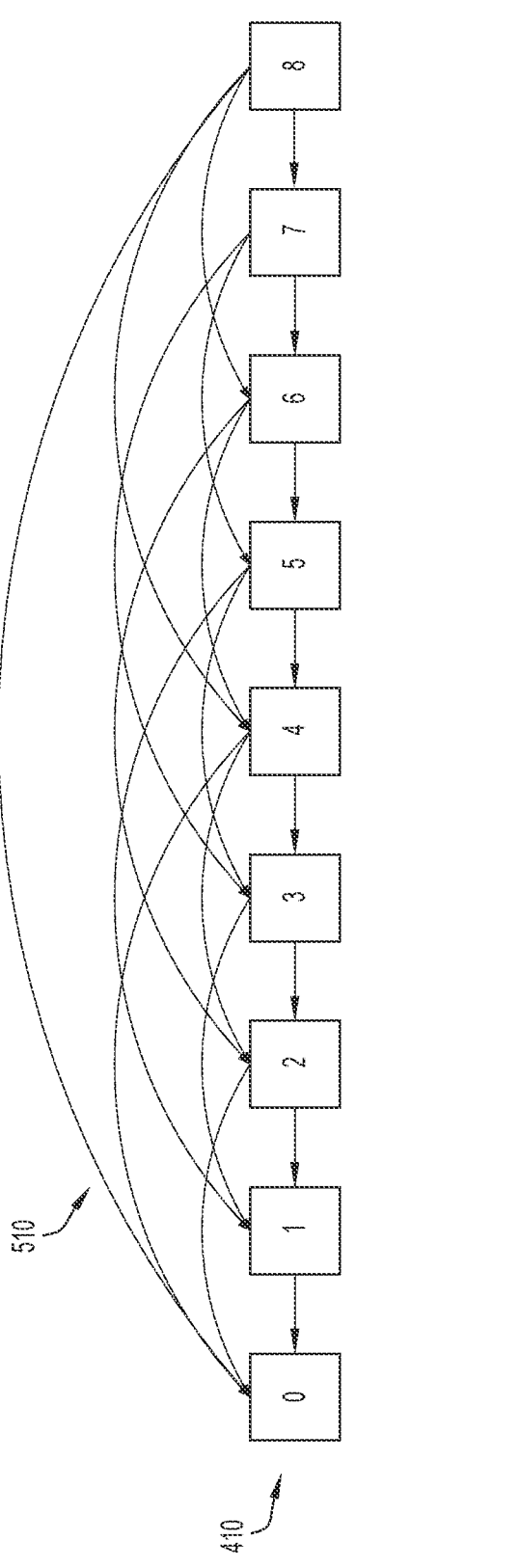
FIG. 5 illustrates a diagram of linking key bundles of epochs of a communication session, according to an example embodiment.

With continued reference to FIGS. 1 and 2, FIG. 3 illustrates a method 300 of generating and storing key bundles, according to an example embodiment. Initially, when a group is first created by a client device 102 (or creator) at operation 305, the client device that creates the group is the only member. The client device uploads an encrypted content encryption key (CEK) for the initial epoch to server 108 at operation 310. When a group member (or committer) adds or removes another group member as determined at operation 315, the end-to-end (E2E) protocol is used to initiate a new epoch N with new epoch keys at operation 320. The committer ensures that it has the key encryption keys (KEKs) for prior epochs N–1, N–2, N–4, . . . , N–$2^M$, for all M such that $2^M \leq N$ at operation 325. This may be accomplished by either loading them from its local cache or fetching them as described below. The committer creates a key bundle for the new epoch N at operation 330 including prior key encryption keys (KEKs) for epochs N–1, N–2, N–4, . . . , N–$2^M$ that are encrypted with the KEK for epoch N. The committer uploads the key bundle and encrypted CEK for epoch N to server 108 at operation 335. All members of the conversation in epoch N can thus decrypt the key bundle, and transitively the key bundles for prior epochs that it references. This enables access to the content encryption keys (CEKs) for those epochs to decrypt and access the content of those epochs.

Optionally, the client device may include additional keys to optimize sequential/full access (e.g., including keys for epochs N-K for K=1 . . . Z in order to have additional Z sequential keys to enable sequential access). Regardless, the choice of which prior epochs to include in the key bundle is consistent across the application. If the epoch is initiated by other than a member (e.g., due to an messaging layer security (MLS) External Commit), then any group member who was a group member in epoch N–1 may create and upload the key bundle for epoch N.

The above process is repeated to detect addition or removal of group members at operation 315 for initiating new epochs until the communication session ends as determined at operation 340.

With continued reference to FIGS. 1-3, FIGS. 4 and 5 illustrate an arrangement of key bundles for epochs of a communication session, according to an example embodiment. By way of example, the communication session is associated with epochs (e.g., $E_0$-$E_8$) and corresponding keys 405, key bundles 410 (e.g., of key encryption keys (KEKs), $KEK_0$-$KEK_8$ corresponding to epochs $E_0$-$E_8$) and content encryption keys (CEKs) 415 (e.g., $CEK_0$-$CEK_8$ corresponding to epochs $E_0$-$E_8$ and key encryption keys $KEK_0$-$KEK_8$). The content encryption keys (CEKs) are encrypted by the corresponding key encryption key (KEK). When a group is first created by a client device for a communication session, the client device is the only member and uploads the encrypted CEK for initial epoch 0 to server 108 as described above. When a group member (or committer) adds or removes another group member, the end-to-end (E2E) protocol is used to initiate a new epoch with new epoch keys. The committer ensures that it has the key encryption keys (KEKs) for epochs N–1, N–2, N–4, . . . , N–$2^M$, for all M such that $2M \leq N$. The committer may load them from its local cache or fetch them as described below. The committer creates a key bundle 410 for the new epoch N based on the above scheme and including prior KEKs for epochs N–1, N–2, N–4, . . . , N–$2^M$ encrypted with the KEK for epoch N. The committer uploads the key bundle and encrypted CEK for epoch N to the server.

For example, keys 405 for epoch $E_8$ include $KEK_8$ and $CEK_8$ with a key bundle of $KEK_7$, $KEK_6$, $KEK_4$, and $KEK_0$ each encrypted by $KEK_8$ (based on the above scheme of N–1, N–2, N–4, . . . , N–$2^M$). Keys 405 for epoch E7 include $KEK_7$ and $CEK_7$ with a key bundle 410 of $KEK_6$, $KEK_5$, and $KEK_3$ each encrypted by $KEK_7$ (based on the above scheme of N–1, N–2, N–4, . . . , N–$2^M$). Keys 405 for epoch E6 include $KEK_6$ and $CEK_6$ with a key bundle 410 of $KEK_5$, $KEK_4$, and $KEK_2$ each encrypted by $KEK_6$ (based on the above scheme of N–1, N–2, N–4, . . . , N–2M). Keys 405 for epoch $E_8$ include $KEK_5$ and $CEK_5$ with a key bundle 410 of $KEK_4$, $KEK_3$, and $KEK_1$ each encrypted by $KEK_5$ (based on the above scheme of N–1, N–2, N–4, . . . , N–2M). Keys 405 for epoch E4 include $KEK_4$ and $CEK_4$ with a key bundle 410 of $KEK_3$, $KEK_2$, and $KEK_0$ each encrypted by $KEK_4$ (based on the above scheme of N–1, N–2, N–4, . . . , N–$2^M$). Keys 405 for epoch E3 include $KEK_3$ and $CEK_3$ with a key bundle 410 of $KEK_2$ and $KEK_1$ each encrypted by $KEK_3$ (based on the above scheme of N–1, N–2, N–4, . . . , N–$2^M$). Keys 405 for epoch E2 include $KEK_2$ and $CEK_2$ with a key bundle 410 of $KEK_1$ and $KEK_0$ each encrypted by $KEK_2$ (based on the above scheme of N–1, N–2, N–4, . . . , N–$2^M$). Keys 405 for epoch E1 include $KEK_1$ and $CEK_1$ with a key bundle 410 of $KEK_0$ encrypted by $KEK_1$ (based on the above scheme of N–1, N–2, N–4, . . . , N–$2^M$). Keys 405 for epoch $E_0$ include $KEK_0$ and $CEK_0$ without a key bundle 410 (since no prior epochs exist).

The sequence of epochs in a key bundle 410 form links 510 (FIG. 5) to key bundles of those prior epochs in order to retrieve key encryption keys (KEKs) of prior epochs. A link from an epoch M to an epoch N indicates that the key bundle for epoch M contains the KEK to decrypt the key bundle for epoch N. The KEKs enable decryption of KEKs of corresponding key bundles that further enable decryption of content encryption keys (CEK) for corresponding prior epochs. The CEKs enable decryption of the content for the prior epochs, thereby providing a member of a communication session access to content prior to joining the group. The specific arrangement of epochs in key bundles 410 described above provides at least one path that traverses epochs in a non-consecutive (or non-sequential) manner, and enables a specific key bundle to be retrieved on an order of O(log N), where N is number of epochs. The log is preferably base 2.

For example: epoch $E_8$ is linked to epochs 7, 6, 4, and 0 based on the epochs in its key bundle; epoch $E_7$ is linked to epochs 6, 5, and 3 based on the epochs in its key bundle; epoch $E_6$ is linked to epochs 5, 4, and 2 based on the epochs in its key bundle; epoch $E_8$ is linked to epochs 4, 3, and 1 based on the epochs in its key bundle; epoch $E_4$ is linked to epochs 3, 2, and 0 based on the epochs in its key bundle; epoch $E_3$ is linked to epochs 2 and 1 based on the epochs in its key bundle; epoch $E_2$ is linked to epochs 1 and 0 based on the epochs in its key bundle; and epoch $E_1$ is linked to epoch 0 based on the epochs in its key bundle. All members of the conversation in an epoch N can thus decrypt the key bundle, and transitively the key bundles for prior epochs that it references to decrypt and obtain corresponding $CEK_8$ for decrypting content of prior epochs. Optionally, additional keys may be provided to optimize sequential/full access (e.g., N-K for K=1 . . . . Z in order to have additional Z sequential keys to enable sequential access).

Figure 6:
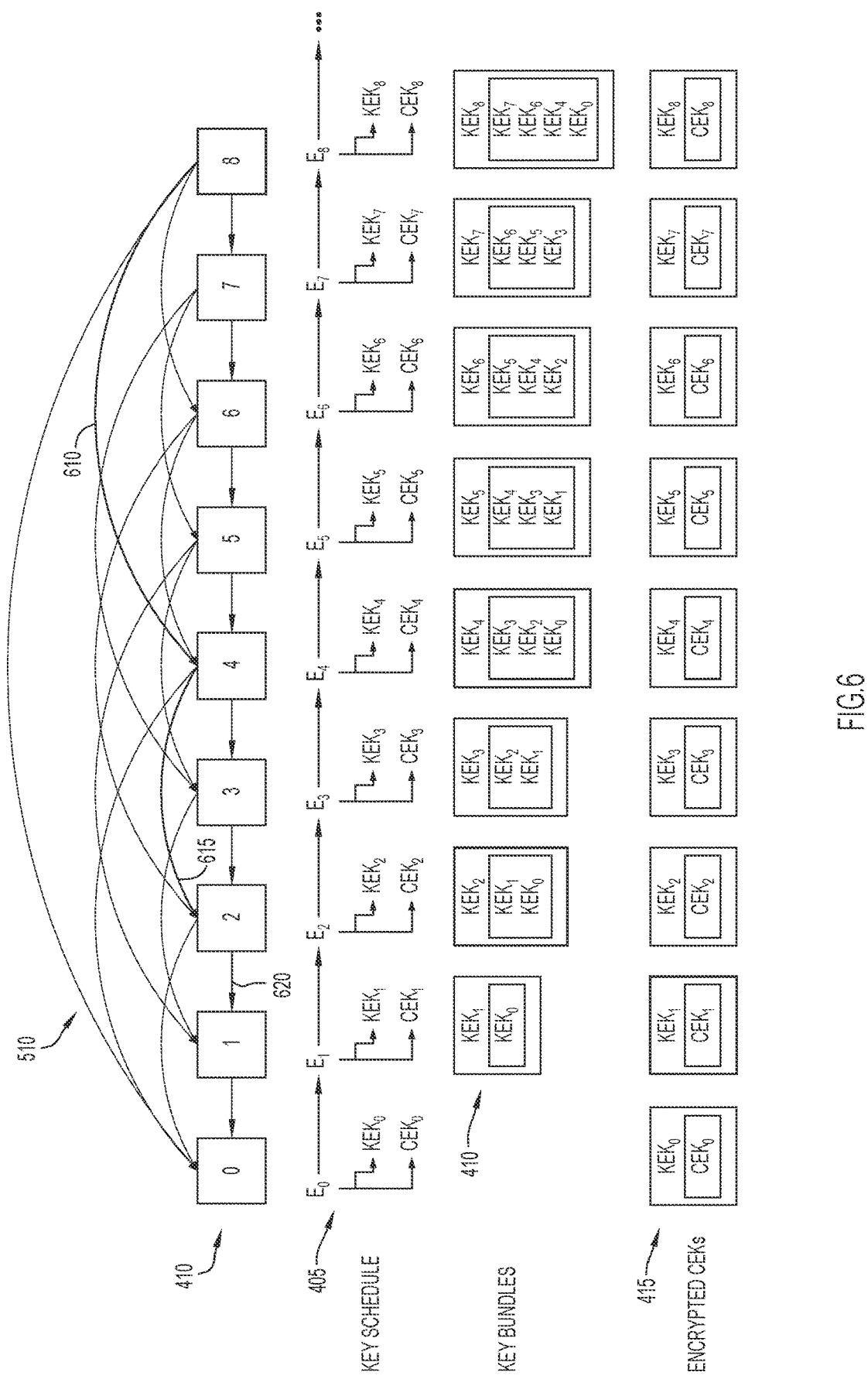
FIG. 6 illustrates a diagram of querying for an arbitrary epoch, according to an example embodiment.

With continued reference to FIGS. 1-5, FIG. 6 illustrates querying for an arbitrary epoch, according to an example embodiment. The arrangement of keys 405, key bundles 410, content encryption keys (CEKs) 415, and links 510 in FIG. 6 is substantially similar to that described above for FIGS. 4 and 5. By way of example, a client device 102 has key encryption keys (KEKs) in a key bundle for a set S of epoch numbers and desires to obtain the content encryption key (CEK) for an epoch M not in the set (and less than the greatest epoch in the set). For example, a client device may desire to access content from epoch 1. The content may include metadata indicating the associated key used to decrypt the content. The client device may obtain the CEK for epoch 1 given knowledge of the KEK for epoch 8 (having a key bundle 410 with KEKs for a set of epochs 7, 6, 5, 4, and 0 as viewed in FIG. 6). The client device queries server 108 with S (epochs 7, 6, 5, 4, 0) and M (epoch 1). The server identifies a sequence of key bundles B_1, . . . , B_K, such that: B_1 is the key bundle for an epoch in S, B_K contains the KEK for epoch M, and B_(i) contains the key encryption key (KEK) for B_(i+1). By construction, such a path always exists, and K~O(log N), where N is the greatest epoch in S. The log is preferably base 2. In this case, the server identifies a path from epoch 8 to epoch 1 with path segments 610 (from epoch 8 to epoch 4), 615 (from epoch 4 to epoch 2), and 620 (from epoch 2 to epoch 1). This may be accomplished using any conventional or other shortest path techniques. The server returns to the client device: the sequence of key bundles (or path) B_1, . . . , B_K, and the encrypted CEK for epoch M. The client decrypts the key bundles in the sequence. B_1 is decrypted with a key from an epoch in S, B_(i+1) is decrypted using a KEK from B_(i), B_N provides the CEK for epoch M, as desired, in order to access content of that epoch.

Figure 7:
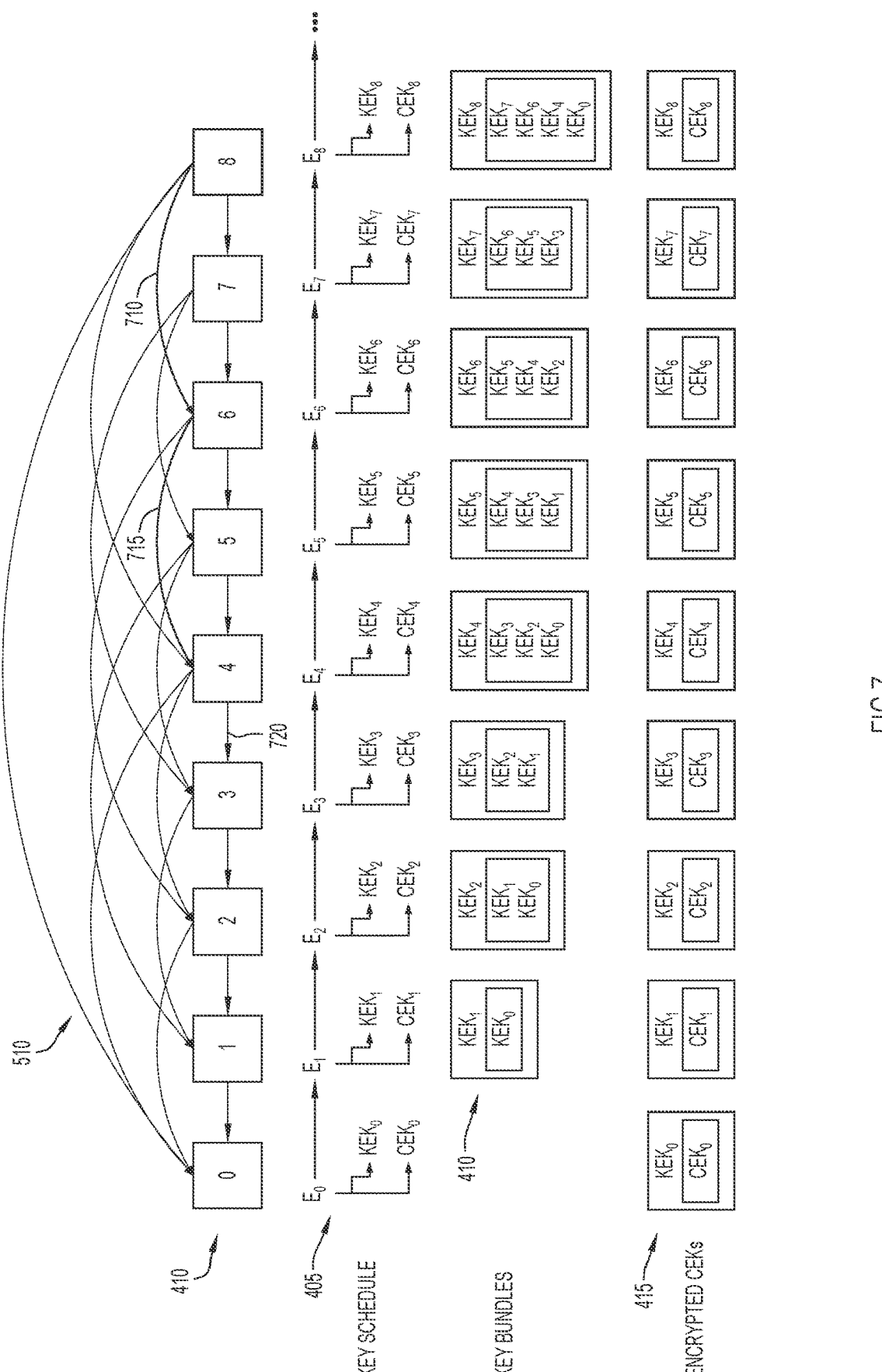
FIG. 7 illustrates a diagram of sequential/full access, according to an example embodiment.
Figure 9:
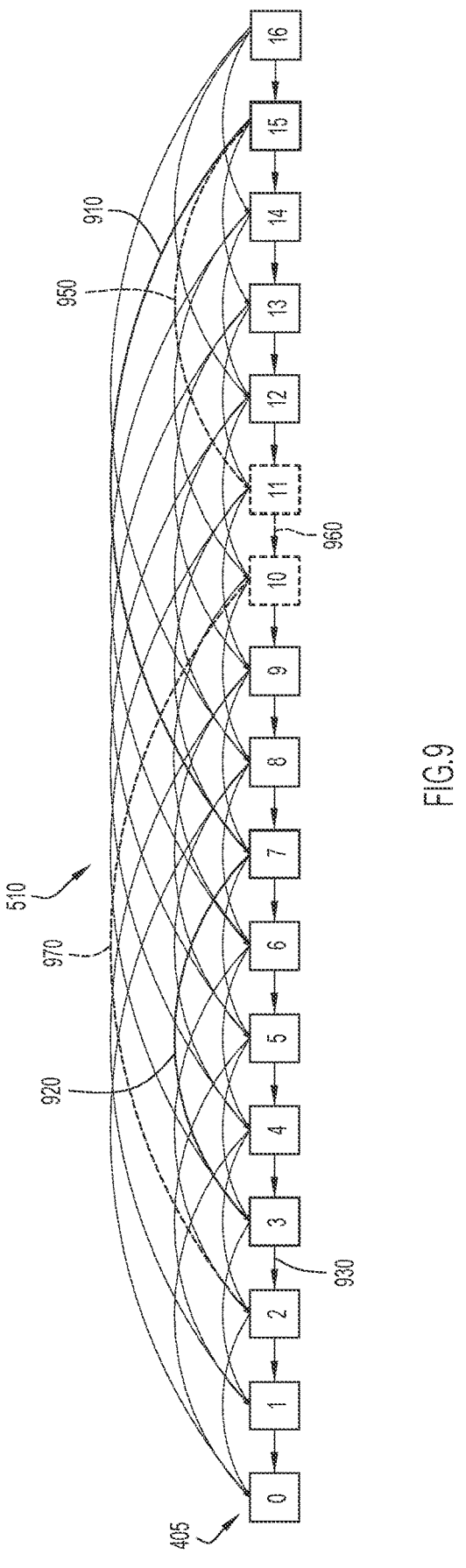
FIG. 9 illustrates a diagram of path determinations, according to an example embodiment.
Figure 10:
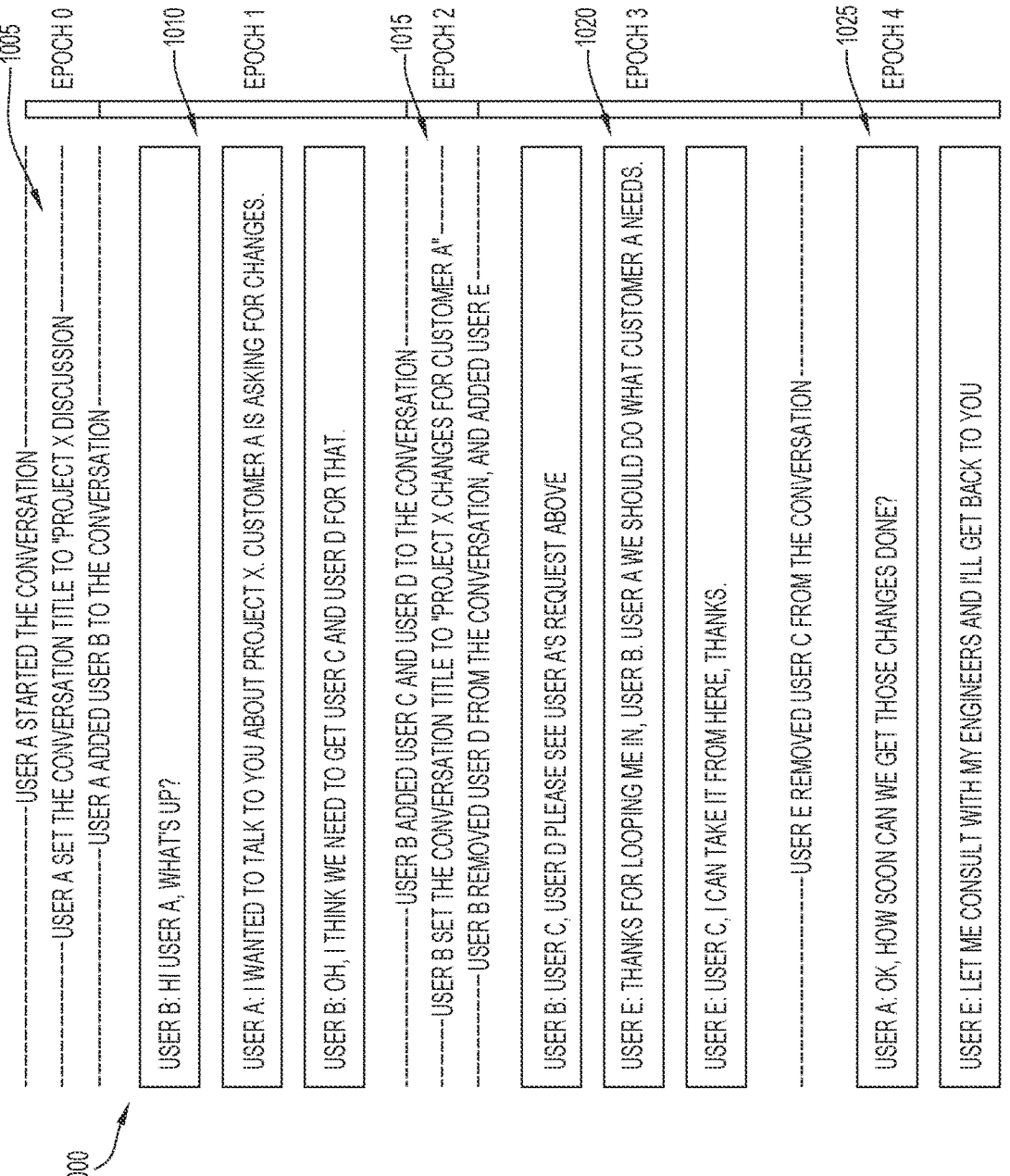
FIG. 10 illustrates a communication session, according to an example embodiment.

With continued reference to FIGS. 1-6, FIG. 7 illustrates sequential/full access, according to an example embodiment. The arrangement of keys 405, key bundles 410, content encryption keys (CEKs) 415, and links 510 in FIG. 7 is substantially similar to that described above for FIGS. 4-6. By way of example, a client device 102 has a key bundle with key encryption keys (KEKs) for an epoch N and desires to obtain access to content encryption keys (CEKs) for a range of epochs prior to N. For example, the client device may desire to access all CEKs for epochs 3-8 given knowledge of the KEK for epoch 8 (having a key bundle 410 with KEKs for a set of epochs 7, 6, 5, 4, and 0 as viewed in FIG. 7). The client device queries server 108 with a range of epochs M . . . N (where M=0 fetches all keys). In this case, the range is epochs 3-8. The server identifies a sequence of key bundles B_1, . . . . , B_K, such that: for each K in M . . . N, the KEK for epoch K is contained in at least one of the key bundles. The KEK for each key bundle is either the KEK for epoch N or contained in a previous key bundle in the sequence.

For example, the sequences may comprise: the key bundles for N, N-1, N-2, . . . . M; the key bundles for N, N-2, N-4, N-6, . . . . M (e.g., stepping by an increment of 2, since the KEK for epoch K-2 is always in the key bundle for epoch K); or the key bundles for N, N-D, N-2D, N-3D, . . . M (e.g., stepping by an increment of D, in the case where each key bundle includes the D previous keys, as in the option above). In this case, the server identifies a path including KEKs for epochs 3-8 with path segments 710 (from epoch 8 to epoch 6), 715 (from epoch 6 to epoch 4), and 720 (from epoch 4 to epoch 3).

The server returns to the client device the sequence of key bundles and the encrypted CEKs for epochs M . . . N. The client device decrypts the KEKs from the key bundles, processing them in sequence. The client device then decrypts the encrypted CEKs using the KEKs to access the content of the corresponding epochs.

With continued reference to FIGS. 1-7, FIG. 8 illustrates a method 800 of building a path between epochs, according to an example embodiment. However, any conventional or other techniques for identifying a path may be used. Initially, server 108 may receive a request for one or more key bundles from a client device 102 as described above. The server determines a path through the epochs to obtain the requested key bundles. The key bundles may be arranged among epochs in substantially the same manner described above (e.g., based on the above scheme of N-1, N-2, N-4, . . . , $N-2^M$). Initially, a difference, D, between desired epochs M and N is determined (e.g., D=M-N) at operation 805. The binary representation of the difference, D, is determined at operation 810. The set of bit positions B={b0, . . . , bk} in the difference D that are set (or have a value of 1) are determined at operation 815.

A set of epochs S is initialized to contain the epoch M, and a value V is initialized to M at operation 820. The entries in the set of bits B are iterated through at operation 825 in any order. For each bit position bi in the set B, the value V is set to V–2^bi and added to the set of epochs S. The last value added is removed from the set of epochs (since it is unnecessary) at operation 830. The set of key bundles for the epochs in set S are returned to the client device at operation 835.

With continued reference to FIGS. 1-8, FIG. 9 illustrates example path determinations, according to an example embodiment. The path may be determined as described above for FIG. 8. By way of example, the epochs include epochs 0-16 with key bundles arranged as described above (e.g., based on the above scheme of N-1, N-2, N-4, . . . , $N-2^M$). In this example case, a path is desired to epoch N=2 given knowledge of key encryption keys (KEKs) of epoch M=15. Initially, a difference is determined (D=M-N=15-2=13 (base 10)) as described above. The binary representation of the difference is determined (D=1101 (base 2)) as described above. The set of bits B containing a value of one in the difference D is determined as described above and includes B={3, 2, 0}. In other words, bits at positions 3 (most significant bit), 2, and 0 (least significant bit) contain a value of 1 or are set. The value V is initialized (V=M=15), and the set of epochs S is also initialized (S={15}) as described above.

The set of bits B={3, 2, 0} may be traversed in any order. By way of example, the set of bits B may be traversed in the order of 3, 2, 0 to update the value (V) and the set of epochs(S) as described above. In this case, V and S are updated as described above for bi=3, where V=V–2^bi=15–2^3=7, and S={15, 7}. V and S are further updated as described above for bi=2, where V=V–2^bi=7-2^2=3, and S={15, 7, 3}. V and S are also updated as described above for bi=0 (V=V–2^bi=3-2^0=2, and S={15, 7, 3, 2}). The last added value (2) is removed from the set S as described above (S={15, 7, 3}), and these key bundles are returned to the client device. This path includes path segments 910 (from epoch 15 to epoch 7), 920 (from epoch 7 to epoch 3), and 930 (from epoch 3 to epoch 2). The key bundles of the epochs within the path provide key encryption keys (KEKs) to obtain the KEKs for epoch 2 (given the KEKs for epoch 15).

By way of another example, the set of bits B may be traversed in the order of 2, 0, 3 to update the value (V) and the set of epochs(S) as described above. The value V is initialized (V=M=15), and the set of epochs S is also initialized (S={15}) as described above. In this case, V and S are updated as described above for bi=2, where V=V−$2^{bi}$=15−$2^2$=11, and S={15, 11}. V and S are further updated as described above for bi=0, where V=V−$2^{bi}$=11−$2^0$=10, and S={15, 11, 10}. V and S are also updated as described above for bi=3 (V=V−$2^{bi}$=10−$2^3$=2, and S={15, 11, 10, 2}). The last added value (2) is removed from the set S as described above (S={15, 11, 10}), and these key bundles are returned to the client device. This path includes path segments 950 (from epoch 15 to epoch 11), 960 (from epoch 11 to epoch 10), and 970 (from epoch 10 to epoch 2). The key bundles of the epochs within the path provide key encryption keys (KEKs) to obtain the KEKs for epoch 2 (given the KEKs for epoch 15).

With continued reference to FIGS. 1-9, FIG. 10 illustrates an example communication session 1000, according to an example embodiment. The communication session represents an example of epochs in an end-to-end (E2E) encrypted messaging scenario. Each message/conversation title is encrypted with the content encryption key (CEK) for the epoch in which it is sent. User A (via a client device 102) initiates the conversation in epoch 0 and performs operations 1005 including setting the conversation title (e.g., "Project X discussion" as viewed in FIG. 10), and adding User B to the conversation which initiates epoch 1. User B (via a client device 102) joins the conversation in epoch 1, downloads the encrypted conversation title (from epoch 0), and fetches the key encryption key (KEK) for epoch 0 in order to obtain the content encryption key (CEK) and decrypt and display the conversation title in substantially the same manner described above. Various messages 1010 are exchanged between Users A and B in epoch 1 based on the key encryption key (KEK) and content encryption key (CEK) for that epoch.

User B (via a client device 102) adds Users C and D to the conversation which initiates epoch 2, and performs operations 1015 including setting the conversation title (e.g., "Project X changes for Customer A" as viewed in FIG. 10), and removing User D and adding User E which initiates epoch 3. User E (via a client device 102) joins the conversation in epoch 3 and performs operations including downloading the encrypted conversation title (from epoch 2), downloading the recent messages from Users A and B (from epochs 1 and 3), and immediately decrypts User B messages in epoch 3. User E (via a client device 102) fetches the key encryption keys (KEKs) for epochs 1, 2, and 3 in order to obtain the content encryption keys (CEKs) and decrypt and display the conversation title and messages in substantially the same manner described above. Users B and E (via client devices 102) exchange messages 1020 in epoch 3 based on the key encryption key (KEK) and content encryption key (CEK) for that epoch.

User E (via a client device 102) removes User C from the conversation which initiates epoch 4. Messages 1025 are exchanged in epoch 4 between Users A and E based on the key encryption key (KEK) and content encryption key (CEK) for that epoch.

With continued reference to FIGS. 1-10, FIG. 11 illustrates a method 1100 for repairing a corrupt key bundle, according to an example embodiment. Initially, a participant of a communication session attempts to decrypt a key bundle for an epoch N. However, key bundles on server 108 may become corrupted due to failures in the underlying storage or tampering by the server. In such cases, the encryption (e.g., Authenticated Encryption with Additional Data (AEAD) encryption, etc.) used for the key bundles on the server returns an error when a client device 102 attempts to decrypt a corrupted key bundle. The client device receives an error from the encryption at operation 1105 when attempting to decrypt a corrupt key bundle for an epoch. The client device communicates this to other client devices participating in the communication session at operation 1110. This may be accomplished by sending a message encrypted with the content encryption key (CEK) of the current epoch.

Any other client device in the communication session that has the key encryption key (KEK) for the epoch and the KEKs that appear in the key bundle for the epoch may repair the corrupt key bundle at operation 1115. The other client device re-creates the key bundle by encrypting the keys for the key bundle with the KEK for the epoch. The other client device uploads the re-created key bundle to server 108 at operation 1120 for access by the client devices participating in the communication session.

FIG. 12 is a flowchart of an example method 1200 for history access, according to an example embodiment. At operation 1205, at least one processor generates a set of encryption keys for a corresponding epoch of a communication session within which a group of communication devices exchange content. The set of encryption keys for the corresponding epoch includes an encryption key for at least one prior epoch of the communication session. At operation 1210, the at least one processor links the corresponding epoch to the at least one prior epoch based on the set of encryption keys. Links between epochs include at least one path traversing the epochs in a non-consecutive manner. At operation 1215, the at least one processor retrieves content of the communication session for the corresponding epoch and one or more prior epochs based on the set of encryption keys.

Figure 13:
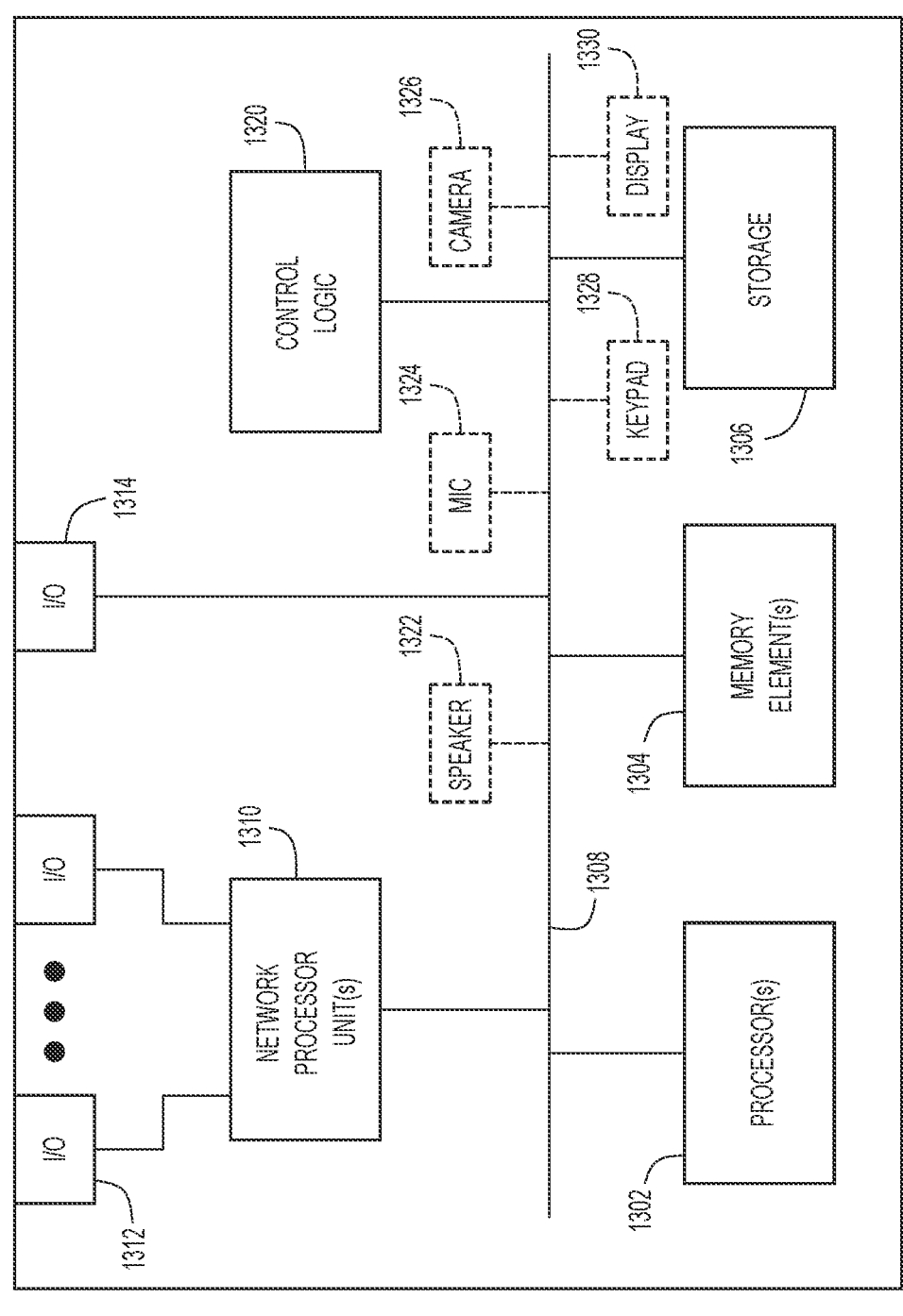
FIG. 13 illustrates a hardware block diagram of a computing device configured to perform functions associated with operations discussed herein, according to an example embodiment.

Referring to FIG. 13, FIG. 13 illustrates a hardware block diagram of a computing device 1300 that may perform functions associated with operations discussed herein in connection with the techniques depicted in FIGS. 1-12. In various embodiments, a computing device or apparatus or system, such as computing device 1300 or any combination of computing devices 1300, may be configured as any device entity/entities (e.g., computer devices, supervisor, server systems, endpoint devices, user devices, client devices, communication devices, etc.) as discussed for the techniques depicted in connection with FIGS. 1-12 in order to perform operations of the various techniques discussed herein.

In at least one embodiment, computing device 1300 may be any apparatus that may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory elements 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) and/or driver(s) controller(s), wireless receivers/transmitters/transceivers, baseband processor(s)/modem(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, any other I/O port(s), and/or antenna(s)/antenna array(s) now known or hereafter developed. Thus, the network processor unit(s) 1310 and/or network I/O interfaces 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, communication device, etc.), computing device 1300 may further include, or be coupled to, a speaker 1322 to convey sound, microphone or other sound sensing device 1324, camera or image capture device 1326, a keypad or keyboard 1328 to enter information (e.g., alphanumeric information, etc.), and/or a touch screen or other display 1330. These items may be coupled to bus 1308 or I/O interface(s) 1314 to transfer data with other elements of computing device 1300.

In various embodiments, control logic 1320 can include instructions that, when executed, cause processor(s) 1302 to perform operations, which can include, but not be limited to, providing overall control operations of computing device 1300; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, network devices, storage devices, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, network devices, storage devices, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory elements 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M)

network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: generating, via at least one processor, a set of encryption keys for a corresponding epoch of a communication session within which a group of communication devices exchange content, wherein the set of encryption keys for the corresponding epoch includes an encryption key for at least one prior epoch of the communication session; linking, via the at least one processor, the corresponding epoch to the at least one prior epoch based on the set of encryption keys, wherein links between epochs include at least one path traversing the epochs in a non-consecutive manner; and retrieving, via the at least one processor, content of the communication session for the one or more prior epochs based on the set of encryption keys.

In one example, the method further comprises: encrypting, via the at least one processor, the set of encryption keys by an encryption key for the corresponding epoch; and storing, via the at least one processor, the set of encryption keys on an untrusted device.

In one example, encryption keys of the set of encryption keys are each used to encrypt a content encryption key for content of an associated epoch.

In one example, the set of encryption keys for an epoch, N, includes encryption keys for prior epochs $N-2^i$, where $i=0$ to M and $2^i \leq N$.

In one example, retrieving content of the communication session comprises retrieving an encryption key for a specific prior epoch by determining a binary representation of a difference between the corresponding epoch and the specific prior epoch and generating a path including epochs corresponding to set bits of the binary representation, wherein the encryption key for the specific prior epoch resides in the set of encryption keys for the epochs of the path.

In one example, retrieving content of the communication session comprises retrieving sets of encryption keys for a range of epochs N to M, wherein a path for retrieving the range of epochs includes epochs M-DI, where D is an increment $\geq 2$ and $I=0$ to P until $M-DI \leq N$.

In one example, a quantity of epochs in a path for retrieving a specific encryption key for a prior epoch is of order O(log N), where N represents the corresponding epoch.

In one example, the method further comprises repairing, via the at least one processor, a corrupt set of encryption keys identified by a communication device of the group of communication devices.

In another form, an apparatus is provided. The apparatus comprises: a network interface configured to enable network communications; one or more processors coupled to the network interface, wherein the one or more processors are configured to: generate a set of encryption keys for a corresponding epoch of a communication session within which a group of communication devices exchange content, wherein the set of encryption keys for the corresponding epoch includes an encryption key for at least one prior epoch of the communication session; link the corresponding epoch to the at least one prior epoch based on the set of encryption keys, wherein links between epochs include at least one path traversing the epochs in a non-consecutive manner; and retrieve content of the communication session for one or more prior epochs based on the set of encryption keys.

In another form, one or more non-transitory computer readable storage media are provided. The non-transitory computer readable storage media are encoded with processing instructions that, when executed by one or more processors, cause the one or more processors to: generate a set of encryption keys for a corresponding epoch of a communication session within which a group of communication devices exchange content, wherein the set of encryption keys for the corresponding epoch includes an encryption key for at least one prior epoch of the communication session; link the corresponding epoch to the at least one prior epoch based on the set of encryption keys, wherein links between epochs include at least one path traversing the epochs in a non-consecutive manner; and retrieve content of the communication session for one or more prior epochs based on the set of encryption keys.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

generating, via at least one processor, a set of encryption keys for a corresponding epoch of a communication session within which a group of communication devices exchange content, wherein the set of encryption keys for the corresponding epoch includes an encryption key for at least one prior epoch of the communication session, and wherein the corresponding epoch of the communication session is initiated in response to a change in membership of a group of communication devices of a prior epoch;

encrypting, via the at least one processor, the set of encryption keys for the corresponding epoch by an encryption key for the corresponding epoch;

linking, via the at least one processor, the corresponding epoch to the at least one prior epoch based on the encryption key for the at least one prior epoch in the set of encryption keys for the corresponding epoch, wherein links between epochs include at least one path traversing the epochs in a non-consecutive manner;

traversing, via the at least one processor, one or more paths from the corresponding epoch to one or more prior epochs based on the links to obtain a set of encryption keys for the one or more prior epochs, wherein traversing the one or more paths includes decrypting a set of encryption keys for a prior epoch along the one or more paths using an encryption key from an epoch linked to the prior epoch; and retrieving, via the at least one processor, content of the communication session for the one or more prior epochs based on the set of encryption keys for the one or more prior epochs.

2. The method of claim 1, further comprising:

storing, via the at least one processor, the set of encryption keys encrypted for the corresponding epoch on an untrusted device.

3. The method of claim 1, wherein encryption keys of the set of encryption keys for the corresponding epoch are each used to encrypt a content encryption key for content of an associated epoch.

4. The method of claim 1, wherein the set of encryption keys for an epoch, N, includes encryption keys for prior epochs $N-2^i$, where $i=0$ to M and $2^i \leq N$.

5. The method of claim 1, wherein retrieving content of the communication session comprises:

retrieving an encryption key for a specific prior epoch by determining a binary representation of a difference between the corresponding epoch and the specific prior epoch and generating a path including epochs corresponding to set bits of the binary representation, wherein the encryption key for the specific prior epoch resides in the set of encryption keys for the epochs of the path.

6. The method of claim 1, wherein retrieving content of the communication session comprises:

retrieving sets of encryption keys for a range of epochs N to M, wherein a path for retrieving the range of epochs includes epochs M−DI, where D is an increment ≥2 and I=0 to P until M−DI≤N.

7. The method of claim 1, wherein a quantity of epochs in a path for retrieving a specific encryption key for a prior epoch is of order O(log N), where N represents the corresponding epoch.

8. The method of claim 1, further comprising:

repairing, via the at least one processor, a corrupt set of encryption keys identified by a communication device of the group of communication devices.

9. An apparatus comprising:

a network interface configured to enable network communications; and one or more processors coupled to the network interface, wherein the one or more processors are configured to perform operations including:

generating a set of encryption keys for a corresponding epoch of a communication session within which a group of communication devices exchange content, wherein the set of encryption keys for the corresponding epoch includes an encryption key for at least one prior epoch of the communication session, and wherein the corresponding epoch of the communication session is initiated in response to a change in membership of a group of communication devices of a prior epoch;

encrypting the set of encryption keys for the corresponding epoch by an encryption key for the corresponding epoch;

linking the corresponding epoch to the at least one prior epoch based on the encryption key for the at least one prior epoch in the set of encryption keys for the corresponding epoch, wherein links between epochs include at least one path traversing the epochs in a non-consecutive manner;

traverse one or more paths from the corresponding epoch to one or more prior epochs based on the links to obtain a set of encryption keys for the one or more prior epochs, wherein traversing the one or more paths includes decrypting a set of encryption keys for a prior epoch along the one or more paths using an encryption key from an epoch linked to the prior epoch; and retrieving content of the communication session for the one or more prior epochs based on the set of encryption keys for the one or more prior epochs.

10. The apparatus of claim 9, wherein encryption keys of the set of encryption keys for the corresponding epoch are each used to encrypt a content encryption key for content of an associated epoch, and the one or more processors are configured to perform further operations including:

storing the set of encryption keys encrypted for the corresponding epoch on an untrusted device.

11. The apparatus of claim 9, wherein the set of encryption keys for an epoch, N, includes encryption keys for prior epochs N−$2^i$, where i=0 to M and $2^i$≤N.

12. The apparatus of claim 9, wherein retrieving content of the communication session comprises:

retrieving sets of encryption keys for a range of epochs N to M, wherein a path for retrieving the range of epochs includes epochs M−DI, where D is an increment ≥2 and I=0 to P until M−DI≤N.

13. The apparatus of claim 9, wherein a quantity of epochs in a path for retrieving a specific encryption key for a prior epoch is of order O(log N), where N represents the corresponding epoch.

14. The apparatus of claim 9, wherein the one or more processors are configured to perform further operations including:

repairing a corrupt set of encryption keys identified by a communication device of the group of communication devices.

15. One or more non-transitory computer readable storage media encoded with processing instructions that, when executed by one or more processors, cause the one or more processors to perform operations including:

generating a set of encryption keys for a corresponding epoch of a communication session within which a group of communication devices exchange content, wherein the set of encryption keys for the corresponding epoch includes an encryption key for at least one prior epoch of the communication session, and wherein the corresponding epoch of the communication session is initiated in response to a change in membership of a group of communication devices of a prior epoch;

encrypting the set of encryption keys for the corresponding epoch by an encryption key for the corresponding epoch;

linking the corresponding epoch to the at least one prior epoch based on the encryption key for the at least one prior epoch in the set of encryption keys for the corresponding epoch, wherein links between epochs include at least one path traversing the epochs in a non-consecutive manner;

traversing one or more paths from the corresponding epoch to one or more prior epochs based on the links to obtain a set of encryption keys for the one or more prior epochs, wherein traversing the one or more paths includes decrypting a set of encryption keys for a prior epoch along the one or more paths using an encryption key from an epoch linked to the prior epoch; and retrieving content of the communication session for the one or more prior epochs based on the set of encryption keys for the one or more prior epochs.

16. The one or more non-transitory computer readable storage media of claim 15, wherein encryption keys of the set of encryption keys for the corresponding epoch are each used to encrypt a content encryption key for content of an associated epoch, and the processing instructions cause the one or more processors to perform further operations including:

storing the set of encryption keys encrypted for the corresponding epoch on an untrusted device.

17. The one or more non-transitory computer readable storage media of claim 15, wherein the set of encryption keys for an epoch, N, includes encryption keys for prior epochs N−$2^i$, where i=0 to M and $2^i$≤N.

18. The one or more non-transitory computer readable storage media of claim 15, wherein retrieving content of the communication session comprises:

retrieving sets of encryption keys for a range of epochs N to M, wherein a path for retrieving the range of epochs includes epochs M−DI, where D is an increment $\geq 2$ and I=0 to P until M−DI$\leq$N.

19. The one or more non-transitory computer readable storage media of claim 15, wherein a quantity of epochs in a path for retrieving a specific encryption key for a prior epoch is of order O(log N), where N represents the corresponding epoch.

20. The one or more non-transitory computer readable storage media of claim 15, wherein the processing instructions cause the one or more processors to perform further operations including:

repairing a corrupt set of encryption keys identified by a communication device of the group of communication devices.

*    *    *    *    *